Patented Jan. 4, 1944

2,338,673

UNITED STATES PATENT OFFICE 2,338,673

METHOD OF RECOVERING FILM SCRAP

Alfred D. Slack, Kingsport, Tenn., assignor to Eastman Kodak Company, Rochester, N. Y., a corporation of New Jersey No Drawing. Application January 23, 1943, Serial No. 473,430

10 Claims. (Cl. 260—230)

This invention relates to the reclamation of film scrap having a cellulose nitrate base and containing thereon auxiliary layers of organic acid esters of cellulose plus, in some cases, dye material.

Processes for reclaiming cellulose nitrate film have been few and those previously suggested present disadvantages of one kind or another. In many of the processes previously suggested, although it has been possible to recover a good share of the cellulose nitrate, there has been some loss of that material and in addition the cost of the reagents used has made previous processes uneconomical. Also, in many cases the color associated with the film, such as that used for backing dyes, has been difficult to remove, thus interfering with the successful carrying out of such a process.

The best method which has been proposed up to now to my knowledge for the recovery of cellulose nitrate film scrap, is one in which the scrap was subjected to the action of alkali in an alcohol solution. This process, although very effective for the purpose, has been found not only to affect the nitrate itself to some extent, thereby reducing the proportion of the nitrate reclaimed, but also removes much of any plasticizer present in the film base proper.

One object of my invention is to provide a method for reclaiming cellulose nitrate film in which most of the cellulose nitrate film base itself is substantially unaffected. Another object of my invention is to provide a method of recovering nitrate film in which removal of both the cellulose ester backing layers and the color which may be present, is accomplished without resulting in a so-called "apple sauce" appearance when the recovered cellulose nitrate is dissolved in a volatile solvent. Other objects of my invention will appear herein.

Some of the more common types of film in which cellulose nitrate is employed as the base and cellulose organic acid ester thin layers are applied thereto for backing layers, are professional cine films of various types, both for positive and for negative purposes. Also, cellulose nitrate base is commonly employed on many types of films designed for amateur use, backing layers of organic acid esters of cellulose being applied thereto to prevent curling, for instance, or to supply a dye backing to facilitate the taking of good sharp pictures therewith. Some of the organic acid esters of cellulose which may be employed for backing layers are the acetone-soluble cellulose acetates, the far-hydrolyzed cellulose esters, such as cellulose acetates which have been hydrolyzed, having an acetyl content of 19–30%, or the corresponding mixed esters of cellulose such as cellulose acetate propionates or cellulose acetate butyrates. In many of these films, dyes of various kinds are also incorporated in the backing layers or in the nitrate film base proper. Also, in many types of film, sensitizing dyes are incorporated, the removal of which is desirable.

Some of the dyes which are employed in connection with photographic film, particularly for backing purposes, are the nigrosines, the triphenyl methane dyes, azo dyes, and the aminoanthraquinones. For instance, dyes such as Helvetia green and acid magenta have been employed as backing layers for photographic film. With all of these dyes, removal is readily effected in accordance with my invention, except in those cases where the film base itself has been dyed.

I have found that cellulose nitrate sheeting which has been coated with thin layers of organic acid esters of cellulose is separated from those layers and from dyes contained therein by treating with hot aqueous alkali for a short time. I have found that this treatment recovers the cellulose nitrate substantially completely, the aqueous alkali affecting the layers which are on the nitrate sheeting without any substantial action on the nitrate itself when the treatment is carefully regulated. It is to the recovery of the nitrate sheeting having thin layers of cellulose esters thereon which ordinarily results from the removal of the gelatin emulsion layers from scrap photographic film that my invention is particularly directed.

Broadly, my invention involves the treatment of cellulose nitrate sheeting containing thin layers of cellulose esters with alkali metal hydroxides or carbonates, using water only as a solvent under heated conditions for a limited period of time. The concentration of alkali in water should be on the order of 1–6%. The temperature employed should be at least 160° F., the treatment becoming more effective as the temperature approaches 200° F. The preferred temperature range for operation of the scrap recovery process is from 180° F. to the boiling temperature. The treatment might be carried out under pressure at a temperature above boiling and the time of treatment thereby reduced to some extent. However, due to the difficulties involved in treatment under pressure, it is preferred that the operation be carried out at a temperature not to exceed the boiling temperature. Ammonium hydroxide may be employed as the alkaline material providing a closed system is used.

For temperatures from 180° up to boiling, a time of treatment of two hours is sufficient for any cellulose ester backing, providing color is not present. With the presence of color a longer time of treatment may be desirable, such as up to six hours. This will depend upon the particular alkali used and the concentration. With a mixture of different types of nitrate film scrap, some colored and some not, a treatment of four to six hours might be employed as a treatment of the non-colored film. Sufficient time to remove the color from the usual colored film will not detrimentally affect the cellulose nitrate therein. Therefore, my invention contemplates treatment for up to six hours when a temperature within the range of 180° F.–212° F. is employed. Obviously, when a short time is employed, such as less than two hours, the removal of the cellulose layers, with a given concentration of alkali, will not be as complete as with the use of the prescribed times unless pressure is employed. Nevertheless, it is to be understood that my invention is of a scope to include a partial, as well as a complete, removal of the backing layers of the scrap nitrate film and even a time of one and a half hours shows some effect in the removal of those backing layers. With a temperature within the range of 160° F.–180° F. it is desirable to allow a longer time by adding one hour to the time specified. The proper time to employ is indicated by the removal of the backing layers, or in a case where dye is present, by the removal of the backing layers and the dye to a substantial extent from the cellulose nitrate layer. Even in cases where the backing layer contains a dye which is difficultly removable, my process exhibits a substantial effect in cutting down the amount of dye which is present so as to adapt the nitrate obtained for uses in which a small amount of color is not objectionable. If such a material is treated for the prescribed time, under the conditions specified, the nitrate which is recovered therefrom will dissolve in a cellulose nitrate solvent without exhibiting the so-called "apple sauce" appearance which is met with in the recovery of coated cellulose nitrate under many of the processes which have been formerly employed for recovery purposes.

In the recovery of film scrap it is desirable to first remove the gelatin emulsion therefrom, such as by treatment with hot water. For instance, one may proceed by first chopping up the film scrap into small pieces, such as ¼-inch squares, and subjecting the comminuted scrap to warm water or preferably warm water containing an enzyme, such as pancreatin, at a temperature between 90° F. and 120° F. until the gelatin emulsion is entirely removed from the film scrap. In many cases the scrap film which is treated will contain a sensitizing dye which usually is a water-soluble dye material which, by this treatment, bleeds out into the cellulose nitrate base. In that case it is desirable to incorporate a small proportion of activated carbon or other adsorbent into the water employed for removing the emulsion so as to selectively adsorb this dye material and thus prevent bleeding into the nitrate layer. Other adsorbents which might be employed instead of activated carbon are activated silica gels or alumina, or an adsorbent natural earth. After the gelatin emulsion has been removed from the scrap film and the film has been washed, it is then ready for treatment in accordance with the method described herein. If desired, the emulsion layer may be removed with the alkaline bath used for removal of the nitrate layer, using the same time and temperature, thus combining two of the operation steps. However, it is then desirable, if the silver is to be recovered, to neutralize this silver bearing suspension before actual recovery of silver.

The following example illustrates our invention:

100 parts of film scrap, all of which consists of cellulose nitrate base, containing backing layers of lower fatty acid esters of cellulose, and some of which contained antihalation dyes, were chopped up and treated with hot water containing pancreatin or some other digestive enzyme for a sufficient time to completely remove the gelatin layer therefrom. This material was then washed and was covered with a 1% solution of sodium hydroxide at a temperature of 180° F. The proportions of liquid to chopped film were approximately 20:1. This treatment was carried out for four hours and the film scrap was taken out of the alkali liquor, washed thoroughly, and dried. The resulting cellulose nitrate was found to dissolve readily in methyl alcohol to form a solution without any evidence of insoluble or poorly dissolved particles.

Instead of sodium hydroxide, sodium carbonate may be employed in recovering cellulose nitrate film in accordance with our invention. The corresponding potassium compound may be employed instead of the sodium compound wherever the latter is referred to herein.

Although my process of recovering film scrap is applicable to the treatment generally of cellulose nitrate base film containing overcoatings of lower fatty acid esters of cellulose, it is particularly directed to the treatment of sheeting of the cellulose nitrates described in U. S. Patent No. 2,118,275 of Ralph H. Talbot. For instance, sheeting from which gelatin emulsion had been completely removed, composed of a base of cellulose nitrate having an $N_2$ content of approximately 12% and a viscosity of approximately 7 seconds, and an overcoating of cellulose acetate, was subjected to treatment wtih dilute aqueous caustic soda at an elevated temperature in accordance with my invention until the cellulose acetate overcoating had been removed from the nitrate material. The cellulose nitrate was washed thoroughly and dried, giving a cellulose nitrate material which dissolves in methyl alcohol and acetone to form a clear flowable solution of "dope."

I claim:

1. A method of treating a cellulose nitrate sheeting material having thereon at least one thin layer of a lower fatty acid of cellulose which comprises subjecting the material to the action of a solution of alkali of 1–6% concentration, water being the sole solvent, at a temperature of at least 160° F. for a time sufficient to result in the substantially complete removal of the thin layers of lower fatty acid ester of cellulose from the cellulose nitrate.

2. A method of treating a cellulose nitrate material having at least one thin layer of a lower fatty acid ester of cellulose thereon so as to recover the cellulose nitrate, which comprises treating the material with a water solution of 1–6% concentration of an alkali selected from the group consisting of the alkali metal hydroxides and carbonates at a temperature of 180–212° F. for 1½ to 6 hours.

3. A method of reclaiming cellulose nitrate from cellulose nitrate sheeting material containing a thin layer of a lower fatty acid ester of cellulose thereon, which comprises treating the material with a solution of sodium hydroxide of 1–6% concentration, water being the sole solvent, at a temperature of at least 160° F. for a time sufficient to substantially completely remove the thin layer from the cellulose nitrate material.

4. A method of reclaiming cellulose nitrate from cellulose nitrate sheeting material having thereon a thin layer of a lower fatty acid ester of cellulose, which comprises treating the material with an aqueous solution of sodium hydroxide of 1–6% concentration, water being the sole solvent, at a temperature of 180° to 212° F. for 2 to 6 hours.

5. A method of reclaiming cellulose nitrate from cellulose nitrate sheeting material having thereon a thin layer of a lower fatty acid ester of cellulose, which comprises treating the material with an aqueous solution of sodium carbonate of 1–6% concentration, water being the sole solvent, at a temperature of 180° to 212° F. for 2 to 6 hours.

6. A method of reclaiming cellulose nitrate from cellulose nitrate sheeting material having thereon a thin layer of a lower fatty acid ester of cellulose, which comprises treating the material with an aqueous solution of sodium hydroxide of 1–6% concentration, water being the sole solvent, at a temperature of 180° to 212° F. for 2 hours.

7. A method of reclaiming cellulose nitrate from photographic film scrap having a cellulose nitrate base and at least one thin layer of a lower fatty acid ester of cellulose, which comprises subjecting the film scrap in comminuted form to the action of hot water to remove the photographic emulsion layer therefrom, and subjecting the resulting material to the action of a dilute aqueous solution of an alkali of 1–6% concentration at a temperature of at least 160° F. for a time sufficient to substantially completely remove the lower fatty acid ester of cellulose from the material.

8. A method of recovering cellulose nitrate from photographic film scrap having a cellulose nitrate base, which comprises treating the scrap in comminuted form with a solution of an alkali selected from the alkali metal hydroxides and carbonates of 1–6% concentration, water being the sole solvent, at a temperature of 180°–212° F. for 2 to 6 hours.

9. A method of recovering cellulose nitrate from photographic film scrap having a cellulose nitrate base and at least one thin layer of a lower fatty acid ester of cellulose and dye material attached thereto, which comprises treating the material in comminuted form with warm water containing an adsorbent, to remove the photographic emulsion material and any water-soluble dye which may be present, followed by treating with an aqueous solution of an alkali of 1–6% concentration, water being the sole solvent, at a temperature of 180° to 212° F. for 4 to 6 hours.

10. A method of recovering cellulose nitrate from a surface dyed or colored cellulose nitrate film scrap, which comprises treating the material in comminuted form with warm water containing activated carbon, to remove the photographic emulsion material and any water-soluble dye which may be present, followed by treating with an aqueous solution of an alkali of 1–6% concentration, water being the sole solvent, at a temperature of 180° to 212° F. for 4 to 6 hours.

ALFRED D. SLACK.